United States Patent [19]
Punia et al.

[11] Patent Number: 4,475,401
[45] Date of Patent: Oct. 9, 1984

[54] VIBRATION DOSIMETER

[75] Inventors: David T. Punia, Burlington; Malcolm Pope, Shelburne; Dennis Donnermeyer, South Burlington, all of Vt.

[73] Assignee: The United States of America as represented by the Department of Health and Human Services, Washington, D.C.

[21] Appl. No.: 380,471

[22] Filed: May 20, 1982

[51] Int. Cl.$^3$ .............................................. G01H 1/00
[52] U.S. Cl. ........................................ 73/658; 73/781
[58] Field of Search .............. 73/658, 659, 660, 649, 73/579, 587, 593, 609; 128/660, 781

[56] References Cited

U.S. PATENT DOCUMENTS

| | | | |
|---|---|---|---|
| 3,393,557 | 7/1968 | Brown et al. | 73/579 |
| 3,554,012 | 1/1971 | Sohoel | 73/579 |
| 3,580,056 | 5/1971 | Warner | 73/579 |
| 3,641,550 | 2/1972 | Lynas et al. | 73/579 |
| 3,713,127 | 1/1973 | Keledy et al. | 73/587 |
| 3,783,679 | 1/1974 | Jackson | 73/609 |
| 4,041,783 | 8/1977 | Shimauchi et al. | 73/579 |
| 4,078,434 | 3/1978 | Weberhofer | 73/593 |
| 4,167,877 | 9/1979 | Avery | 73/579 |

*Primary Examiner*—Stephen A. Kreitman
*Attorney, Agent, or Firm*—Browdy and Neimark

[57] ABSTRACT

An apparatus to monitor and record, for an industrial environment, two natural frequencies with respect to a "seated spinal system", namely, approximately 10 Hz and approximately 4 Hz, the natural resonant frequencies of the spine. Raw acceleration signals are amplified, conditioned and filtered to allow only 20 Hz or less to pass. The signals are then divided into two respective channels, namely, below 20 Hz and below 8 Hz, following parallel paths through an amplitude detector and through a zero crossover detector, rectifier and digital filter. In each path the amplitude detector controls a storage flip-flop, which enables an associated decade counter when amplitude criteria are met. The digital filter supplies an output, via an AND gate, to the counter if both amplitude and frequency criteria are met. Thus, a count is stored in the counter if both amplitude and frequency criteria are met. Each channel has an LED display which can be turned on, after exposure, to display the number of events recorded.

11 Claims, 5 Drawing Figures

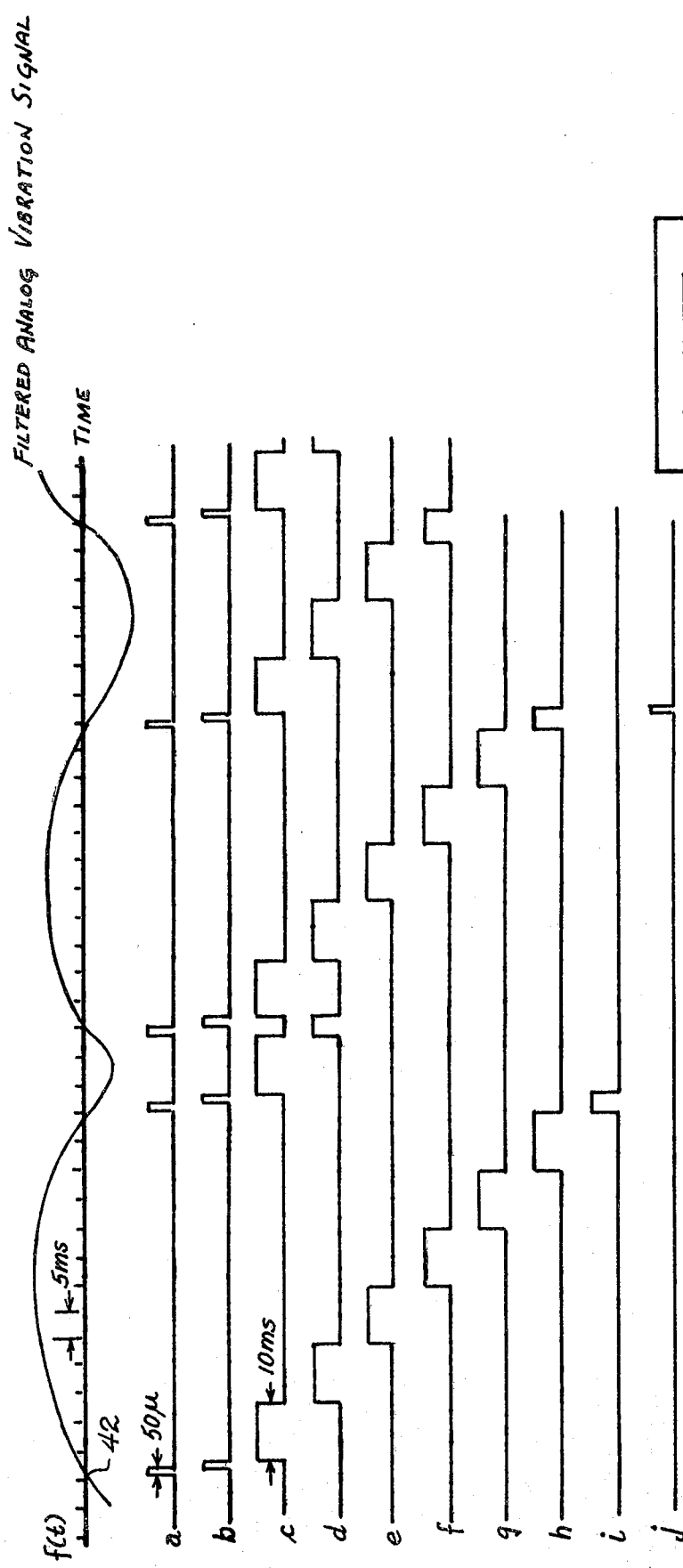
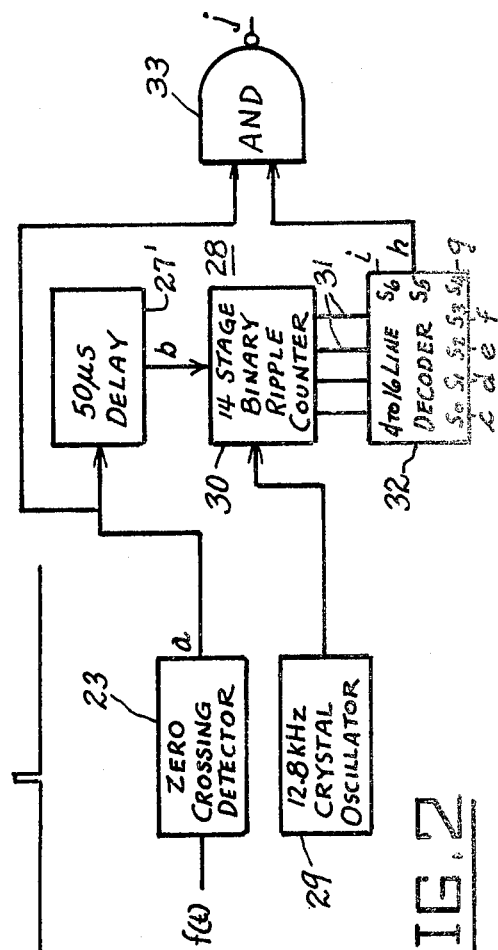
FIG. 2
FIG. 3

VIBRATION DOSIMETER

The invention described herein was made in the course of work under a grant or award from the Department of Health and Human Services.

FIELD OF THE INVENTION

This invention relates to vibration dosimeters, and more particularly to an apparatus to monitor and record two important frequency components in a vibratory industrial environment which may adversely affect the human spinal system.

BACKGROUND OF THE INVENTION

None of the vibration monitoring and recording devices previously used in environmental work area studies has been directed toward monitoring the natural frequencies of the human spine. While numerous methods and apparatus for the frequency-monitoring of vibrational environments have been employed in the prior art, these previously employed systems generally measure vibrations of the environment where the events under analysis are oscillatory or periodic, and are of a substantially non-transient nature. There is a definite need for means to monitor and log transient events as short as a half cycle in duration. This need is not met by the use of the analog filtering techniques employed in the prior art vibration monitoring systems. There is also a definite need for accurately measuring and recording certain low frequency vibrations of particular importance with regard to their effects on the human spinal system, particularly in a seated position of the human body. Thus, rather than measuring the response of a system to a known repetitive input impulse, the characteristics of the driving input impulses should be measured and recorded, and quantitative indications of a given vibratory environment should be obtained with respect to those frequencies affecting the human spine. The prior art systems do not monitor the important specific frequency ranges of vibratory stress and do not impose suitable amplitude of acceleration thresholds before counting the events.

A preliminary search of the prior U.S. patents revealed the following U.S. patents of interest:

| | |
|---|---|
| Brown et al, | 3,393,557 |
| Sohoel | 3,554,012 |
| Warner, | 3,580,056 |
| Lynas et al, | 3,641,550 |
| Shimauchi et al, | 4,041,783 |
| Weberhofer, | 4,078,434 |
| Avery, | 4,167,877 |

SUMMARY OF THE INVENTION

The apparatus of the present invention is intended to monitor and record, for an industrial environment or for vehicle vibration exposure, two vibrational frequencies of significance with respect to a seated spinal system, namely, approximately 10 Hz and approximately 4 Hz, the natural frequencies of the human spine, excessive exposure to which give rise to low back disorders. The apparatus is intended to discriminate event ranges containing these regions of vibratory stess, as well as to meet a preset threshold amplitude of acceleration before counting the events. A piezoelectric detector, exposed to the vibratory environment, generates raw acceleration signals, which signals are first amplified and conditioned, and then filtered to allow only 20 Hz or less signals to pass. The signals are then Y-gated for the amplitude detection and further filtering of two independent channels, namely, 20 Hz or less and 8 Hz or less. The amplitude detector utilizes two comparators, with a 2-volt precision reference to monitor amplitude, and has an adjustment to vary the set point of the amplitude detector's gain. From the Y-gate the signals follow a parallel path through a zero crossover detector, rectifier, and a digital filter. The outputs of the amplitude detector and digital filter are fed to an AND gate, where if both amplitude and frequency criteria are met, a count is recorded and stored in a decade counter. A seven-segment LED display, which is not energized during use, can be turned on by the operator after the field exposure to display the number of events recorded.

As above mentioned, various different types of vibration monitoring and recording devices have been employed in environmental work areas, but none has been specifically concerned with providing the ability to monitor the natural frequencies of the spine.

Accordingly, a main object of the invention is to provide an improved environmental vibration monitoring and recording system which overcomes the deficiencies and disadvantages of the prior vibration monitoring and recording devices.

A further object of the invention is to provide a novel and improved environmental vibration monitoring and recording system which monitors vibrations containing the natural frequencies associated with the human spine.

A still further object of the invention is to provide an improved environmental vibration monitoring and recording system for separating input vibration signals into two independent channels, namely, 20 Hz signals and below, and 8 Hz signals and below, with amplitude threshold adjustment, wherein if both amplitude and frequency criteria are met, a count is recorded and stored in a decade counter, and wherein a display of the number of events during a period of field exposure can be subsequently given.

A still further object of the invention is to provide an improved environmental vibration monitoring and recording system which can be employed in an industrial environment over a long continuous period of time to detect and record vibration frequency components approximately in the range of natural frequencies of the human spine and, above a preset amplitude value, whereby to obtain information which can be correlated to the prevalence of low back disorders developed by persons exposed to this environment.

BRIEF DESCRIPTION OF THE DRAWINGS

Further objects and advantages of the invention will become apparent from the following description and claims, and from the accompanying drawings, wherein:

FIG. 2 is a block diagram of a digital filter section employed in the vibration monitoring system of FIG. 1.

FIG. 3 is a timing diagram illustrating the operation of the digital filter section of FIG. 2.

DETAILED DESCRIPTION OF A PREFERRED EMBODIMENT

Figure 1:
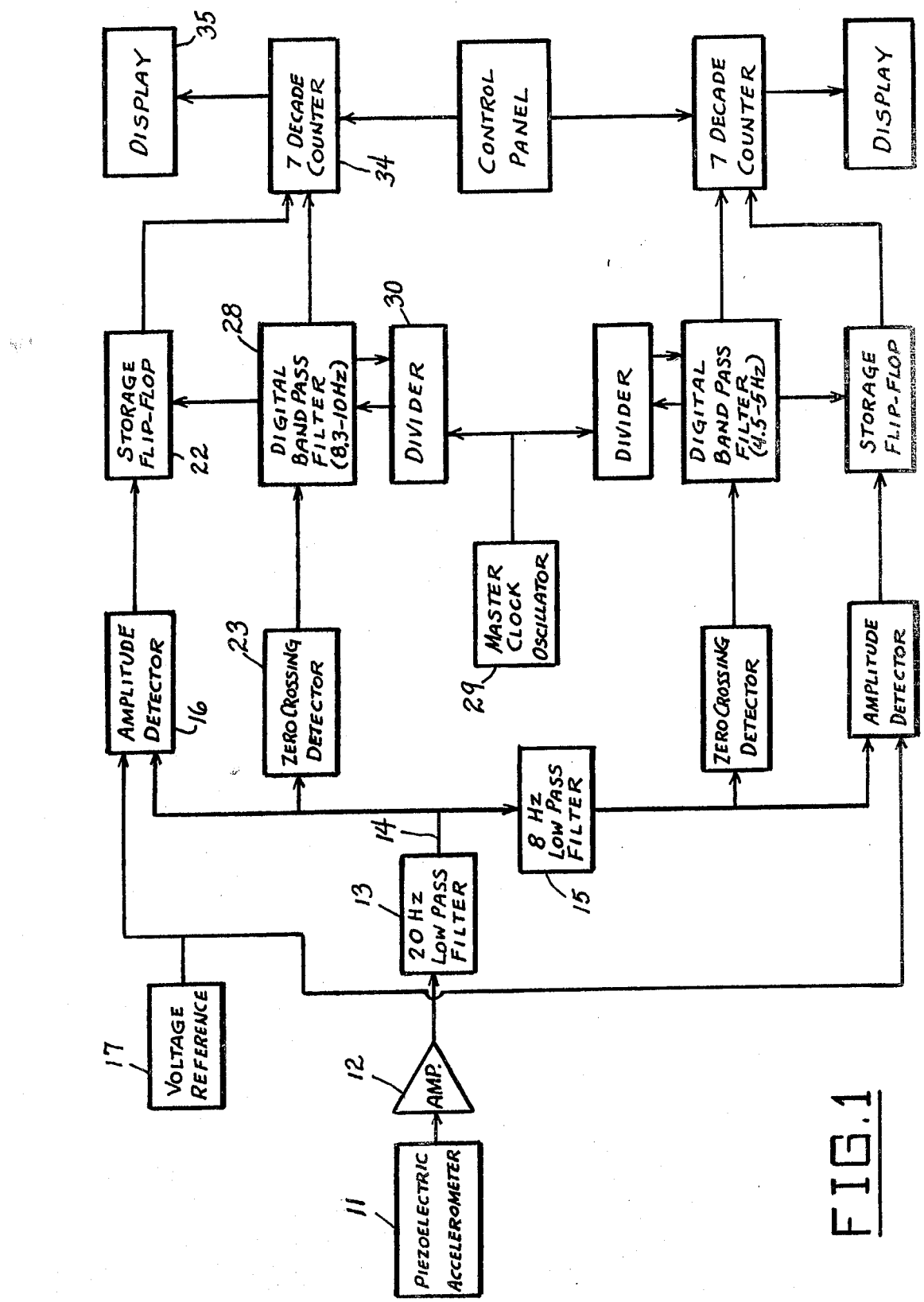
FIG. 1 is a block diagram of an improved vibration monitoring system constructed in accordance with the present invention.

Referring to the drawings, and more particularly to FIG. 1, the vibration monitoring and recording system comprises a piezoelectric accelerometer or vibration-sensing element 11, such as Endevco Model 2217, which is of durable construction and which does not require any external power supply or excitation signal. The accelerometer output is amplified by a FET input operational amplifier 12 with a gain of about 200. The output of amplifier 12 is supplied to an active third order Chebyshev low pass filter 13 with a 20 Hz cut-off frequency. This filter is intended to eliminate transient shock effects and to prevent high frequency signals from falsely triggering the amplitude detection circuitry. At this point in the circuit, shown at 14, the filtered vibration signal feeds two paths to the remaining signal processing components, one for each frequency band of interest. For the low frequency section, the signal passes through another low-pass filter 15, this one with a cut-off frequency of 8 Hz, but otherwise similar in design to the 20 Hz filter 13. Beyond this point the two sections operate in an identical manner.

Figure 5:
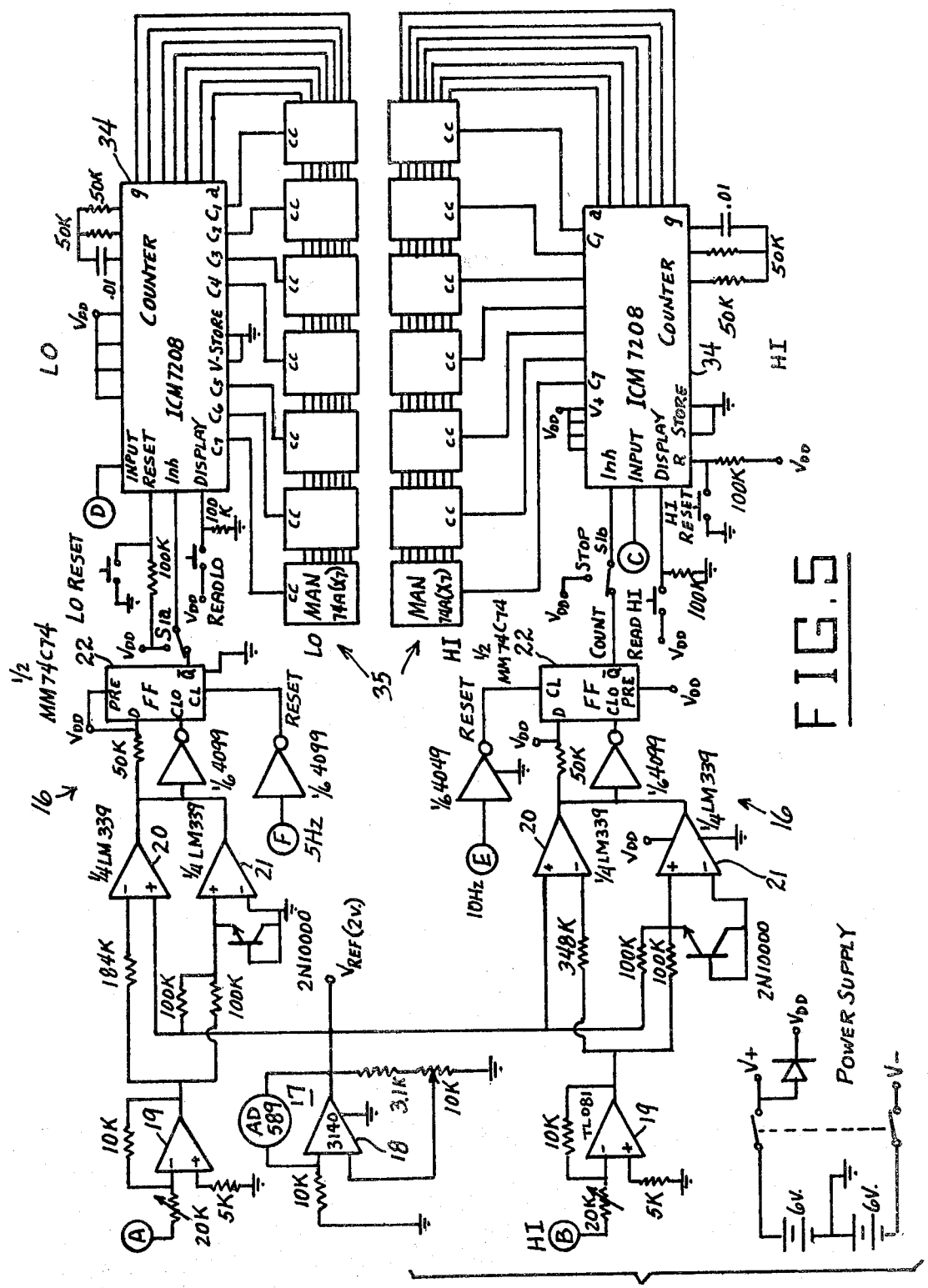

Referring to FIG. 1, in each channel an amplitude detector 16 continuously compares the filtered acceleration signal to a stable reference voltage generated by a 1.23 volt bandgap reference voltage source 17 buffered by an operational amplifier 18 (see FIG. 5). The set point is determined by the setting of a variable gain operational amplifier 19 which feeds the vibration signal to two comparators 20, 21, one for the positive half of the waveform and the other for the negative half. The open collector outputs of the comparators 20, 21 are wire OR'd so that an output change occurs for either polarity. The negative polarity comparator 20 is wired in a current balancing configuration that permits comparison of a negative voltage to a positive reference. Since peak amplitude will occur well before the second zero crossing of a half-wave, the comparison result is stored in a flip-flop 22.

Figure 4:
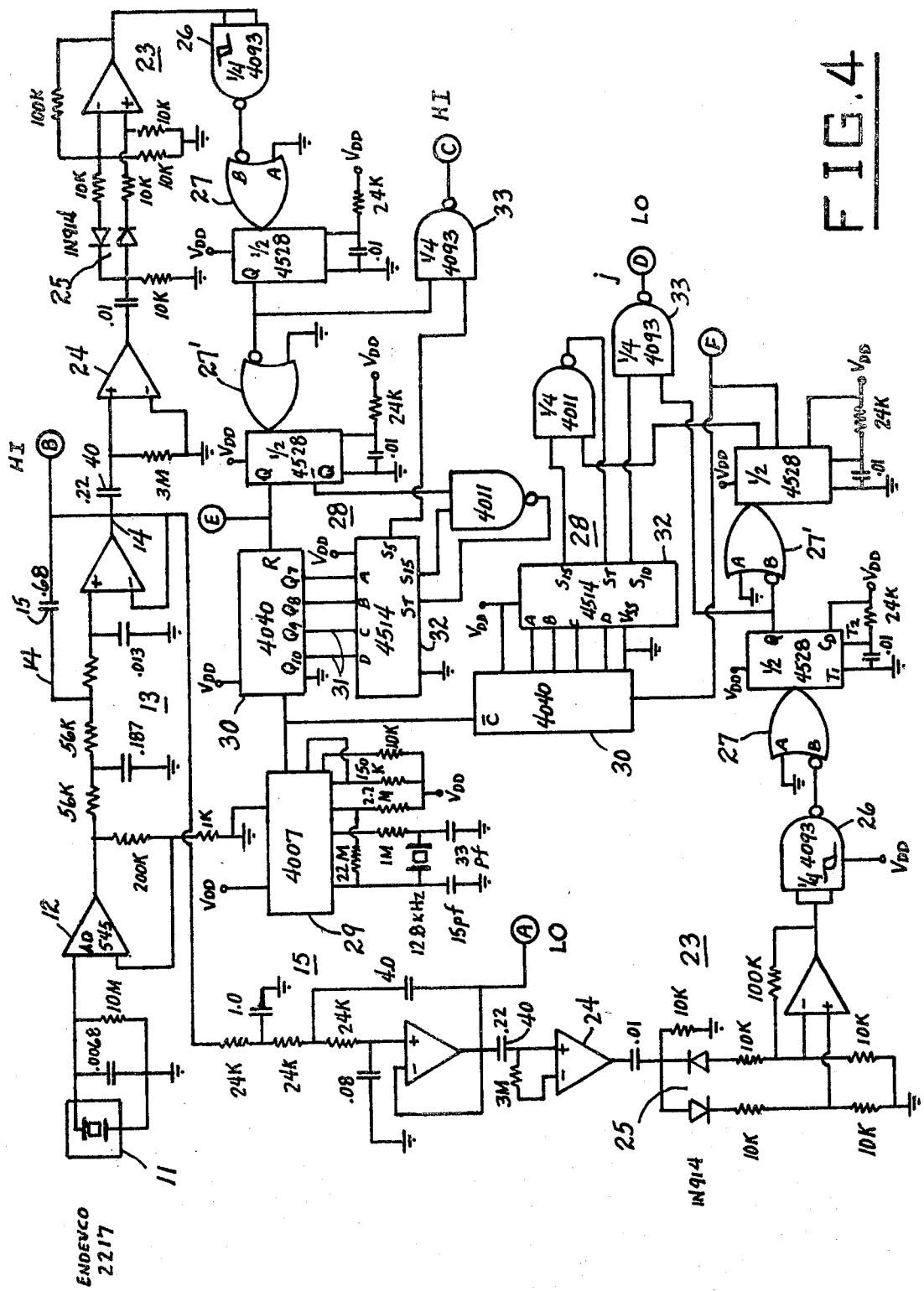
FIGS. 4 and 5, taken together, form a detailed wiring diagram of a vibration monitoring and recording system according to FIG. 1.

The zero crossing detector 23 comprises a high gain amplifier 24 (see FIG. 4), a full wave rectifier 25, a Schmitt trigger 26 and a one-shot multivibrator 27. The filtered vibration signal is A.C.-coupled via a capacitance 40 to remove D.C. offset. The operational amplifier 24 running at open loop gain produces a square wave output, saturating after each zero crossing. A.C. coupling through a network with a 0.1 msec time constant gives spikes of alternating polarity. The full wave rectifier 25 with gain transforms these into unipolar pulses about 200 microsec in duration, but with an exponentially decaying falling edge. Finally, the pulses are cleaned up by the Schmitt trigger 26 whose output triggers the monostable multivibrator 27 which outputs a clean, fast 50 microsec pulse with each zero crossing of the vibration waveform.

To follow the zero-cross detectors, the use of analog band pass filters was initially considered, but was deemed inappropriate because analog band pass filters need several cycles of input at the tuned frequency for the output to reach full amplitude. Thus, the first few cycles coming through the filter could be significantly attenuated, and non-repetitive events might be missed entirely. The digital approach, a pulse interval timing technique, is impervious to these types of errors and will respond reliably to single half-cycle events. Additionally, it is easy to program different frequency bands and band widths. Therefore, a digital bandpass filter 28 is used, following the zero crossing detector 23.

A block diagram of the digital filter 28 is shown in FIG. 2. A master clock 29 comprises a 12.8 kHz crystal-controlled oscillator. The oscillator 29 feeds a 14-stage binary counter 30, allowing a broad choice of pulse train frequencies. Four adjacent output lines 31 are used to drive the inputs of a 4-to-16 line decoder 32. This is simply a logic network with 16 outputs, only one of which is active at a given moment. The active output is determined by the four-bit binary code appearing at the inputs. In free running operation, the four binary inputs continuously reflect a sequential binary count at twice the frequency of the highest pulse rate counter stage chosen. The counter 30 also contains reset capability which sets all of the outputs to "zero" states. Thus, starting from the "zero" count, each output of the 4-to-16 line decoder 32 becomes active, in sequence, for a period of time equal to the width of the highest-frequency clock pulse. The circuit operates during the intervals between zero crossing pulses and resets 100 microsec after every zero crossing. A one-shot multivibrator 27' provides a 50 microsec delay after each zero crossing to allow the circuit to decide if a particular zero crossing falls within the range of periods (i.e., frequencies) of interest.

The counter 30 comprises the "divider" associated with a band pass filter 28 in FIG. 1.

A timing diagram is shown in FIG. 3. Upon receipt of a reset pulse (line b), the binary counters 30 are set to zero, activating the first, or "zeroeth", output (line c) of the decoder 32. This output remains active for approximately the first 10 msec after the zero crossing, shown at 42, since the least significant input bit to the decoder changes at a frequency of 50 Hz. After 10 msec, the count increments, and the next output in sequence, d, becomes active for the 10-20 msec window. This process (e,f,g,h,etc.) continues, with each output becoming active for 10 msec. The output that is active during the interval corresponding to a frequency of interest (h) is ANDed at AND gate 33 (FIG. 2) with the output (a) of the zero crossing detector. Therefore, if the proper decoder output is active when another zero-crossing pulse comes along, an output pulse is generated. If that particular output is not active when the next zero-crossing pulse occurs, no j pulse is produced. In either case, the counter 30 as well as the amplitude detector flip-flop 22, is reset 50 microsec later, and the process repeats. In the event that a period of time elapses such as would allow the 4-bit count to "roll over", or increment from 15 to zero, the decoder 32 is disabled, so as to prevent subharmonics from producing false counts.

The pulses that pass through the band pass filter 28 clock a monolithic seven-decade counter 34, complete with drivers for the multiplexed seven-segment LED displays 35. The input to the counter string is inhibited or enabled by the output of the flip-flop 22 that previously stored the output of an amplitude detector 16. Thus, two conditions, namely, minimum amplitude during the half cycle, and proper zero crossing interval, must be satisfied to increment the counter 34. The LED displays can be turned off, and another control panel switch $S_{1a}$ disables the counter to prevent counting during transport or installation if the power is left on.

Preferably all digital components are of the CMOS type, for low power consumption and immunity to power supply voltage changes. Power for up to 2 weeks of operation is supplied by two rechargeable, sealed, lead acid batteries (see FIG. 5) with nominal 6-volt, 10 amp-hour ratings. In a typical embodiment, the batteries and the electronic components were housed in an aluminum case, measuring 9"×4"×4". The accelerometer 11 was mounted on a plate encased inside a cushion of the type often used by drivers to provide ventilation between the vehicle seat and the driver. The cushion contained a coiled spring extending spirally out from the center of the cushion, providing sufficient vertical rigidity for the transmission of vibrations, and at the same time being flexible enough to interfit with seats of varying contours. A cylindrical dome was employed between the accelerometer housing and the cushion to prevent physical contact therebetween, to prevent false response of the accelerometer by physical stress on its case. A commercially available coaxial cable of substantial length was used to connect the accelerometer pad to the instrument case and to permit flexibility in mounting, the cable being specifically designed for piezoelectric transducer applications and which minimizes static electricity stray charges generated by relative movement of its inner and outer conductors, thereby minimizing spurious signals to the system derived from such charges.

While numerous methods for frequency-selective monitoring of vibrational environments are well known and documented, there are certain features unique to the apparatus of the present invention which should be noted. One unique aspect of the dosimetry circuitry herein described is its ability to monitor and log transient events as short as a half cycle in duration. By their very nature, analog filtering techniques previously employed deal with selected process signals that are periodic or oscillatory. The zero-crossing interval timing technique employed in the dosimeter apparatus of the present invention allows accurate processing of transients that are a periodic and heavily damped, and that are of a nature representing an impulse response rather than an oscillatory response. Also, rather than measuring the response of a system to a known, repeatable input, the apparatus of the present invention examines the characteristics of the impulse itself. Rather than measuring the actual resonant frequencies of a system, the herein-described apparatus seeks to obtain a quantitative indication of how a given vibratory environment might affect that system.

Furthermore, it will be seen that the circuitry of the herein-described apparatus permits the processing of very low-frequency information (below 20 Hz) without requiring the physically large capacitors and inductors required for analog realization of the filters used. Additionally, filter bandwidth and Q factor are not as sensitive to component variations as in analog filtering techniques.

Finally, the intended application of the herein-described dosimeter is not in determining the exact amplitude, wave form or energy content of the input signals, but rather to monitor, over a long period of time, the number of impulses having greater than a preset amplitude and to record their frequency of occurrence.

While a specific embodiment of an improved vibration dosimeter has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. A vibration dosimeter apparatus comprising vibration-sensing transducer means providing an electrical analog signal responsive to environmental vibrations, amplitude-detector means to compare the amplitude of said analog signal with a selected reference amplitude to obtain a comparison signal, digital counter means, means to generate output signal pulses representing selected zero crossings of said analog signal, means to apply said output signal pulses to said counter means, means to inhibit said counter means from incrementing the output signal pulses unless said comparison signal rises above a predetermined voltage reference value, digital data read-out means operatively connected to the output of said counter means, means to filter said analog signal to remove frequencies above a predetermined band, whereby to derive a resultant filtered analog signal from which to obtain the comparison signal, and wherein said predetermined band comprises a range including natural frequencies of parts of the human body.

2. The vibration dosimeter apparatus of claim 1, and wherein said predetermined band comprises vibration frequencies below 20 Hz.

3. The vibration dosimeter apparatus of claim 1, and wherein said means to inhibit incrementing of said counter means comprises circuit means including a storage flip-flop unit controlling said counter means and means operatively coupling said amplitude-detector means to said flip-flop unit.

4. The vibration dosimeter apparatus of claim 1, and wherein said means to generate said output signal pulses comprises pulse-forming zero-crossing detection means to detect each zero crossing and form a crossing pulse therefrom, and digital band pass filter means connected to the output of said zero-crossing detection means and having crossing pulse-selecting means for selecting output pulses spaced according to a frequency of interest.

5. The vibration dosimeter apparatus of claim 1, and wherein the apparatus comprises two independent channels in one of which said predetermined band comprises the vibration frequencies below 20 Hz and in the other of which said predetermined band comprises the vibration frequencies below 8 Hz.

6. The vibration dosimeter apparatus of claim 1, and wherein said vibration-sensing transducer means comprises a piezoelectric accelerometer.

7. The vibration dosimeter apparatus of claim 1, and wherein the means to generate the output signal pulses representing selected zero crossings comprises a zero-crossing detector generating a zero crossing pulse with each zero crossing of said filtered analog signal, digital band pass filter means to furnish an output signal pulse responsive to successive receipt of a selected number of said zero crossing pulses, and circuit means connecting said zero crossing pulses to the input of said digital band pass filter means.

8. The vibration dosimeter apparatus of claim 7, and wherein said last-named circuit means includes means providing a time delay of approximately 50 microseconds.

9. The vibration dosimeter apparatus of claim 7, and wherein said zero-crossing detector comprises rectifying circuit means for demodulating said resultant filtered analgo signal, and circuit means including a Schmitt trigger and a multivibrator connecting the output of said rectifying circuit means to said digital band pass filter means.

10. The vibration dosimeter apparatus of claim 9, and wherein said digital band pass filter means comprises a clocked binary counter provided with decoder means having outputs representing respective counts of input zero crossing pulses, a two-input AND gate, and respective circuit means applying the multivibrator output to one input terminal of said AND gate and a selected output of said decoder means to the other input terminal of the AND gate, whereby to provide said output signal pulse at the AND gate output terminal.

11. The vibration dosimeter apparatus of claim 1, and wherein said amplitude-detector means comprises a source of reference voltage, and comparator circuit means connected to compare said analog signal with said reference voltage, said comparator circuit means comprising two comparators, one for the positive half of the analog signal and the other for the negative half, and output circuit means providing an output signal change for either polarity of the analog signal waveform.

* * * * *